Inventor:
John Richard Hill
By: Stevens, Davis, Miller & Mosher
Attorneys

Inventor
John Richard Hill
By: Stevens, Davis, Miller & Mosher
Attorneys

United States Patent Office 3,064,138

Patented Nov. 13, 1962

3,064,138

ELECTRICAL IMPEDANCE NETWORKS

John Richard Hill, Stafford, England, assignor to The English Electric Company Limited, London, England, a British company Filed Feb. 13, 1959, Ser. No. 793,075
Claims priority, application Great Britain Feb. 28, 1958
4 Claims. (Cl. 307—57)

Figure 1:
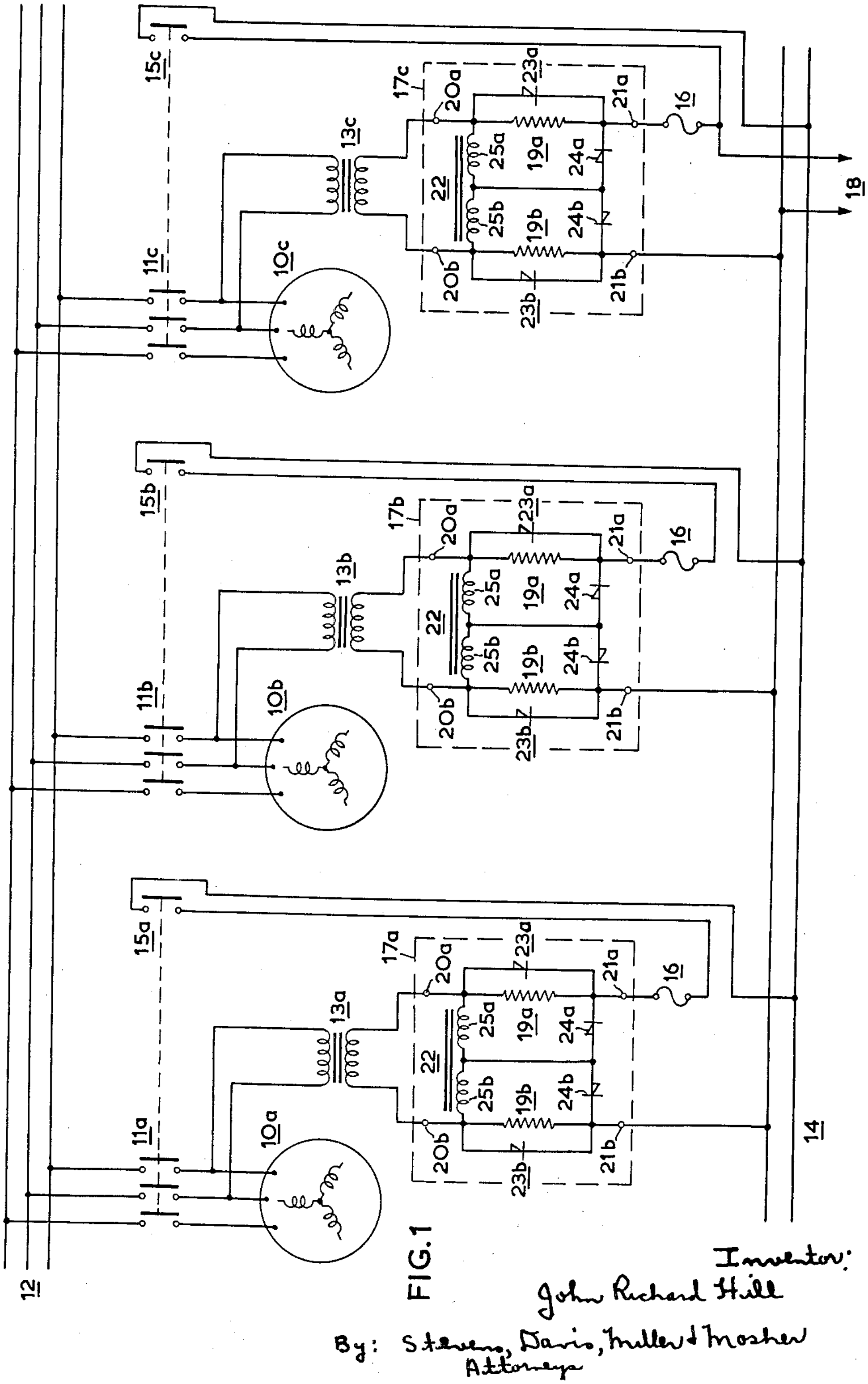

This invention relates to electrical reverse power limitation impedance networks for alternating current circuits.

The utility of such a network is illustrated by its use in the metering circuit of an alternating current supply system employing a plurality of alternators which may operate in parallel. Each alternator may be provided with a voltage transformer to supply a low voltage representing in magnitude and phase the voltage of its corresponding alternator. When the alternators are connected in parallel, the outputs of the voltage transformers may also be parallel on to a bus-wire to provide a metering supply. If, however, one of the alternators becomes disconnected, and the outputs of the voltage transformers remain connected in parallel, a reverse power limitation impedance network, permanently connected between the metering bus-wire and the secondary winding of the voltage transformer of this alternator, will prevent an excessive current from flowing to this secondary winding from the metering bus-wire.

One feature of the invention is the provision of an electrical reverse power limitation network for alternating current circuits having at least one impedance in series with a current path for power transfer through the network and means for maintaining the voltage drop in the said impedance at a value indepedent of the value of the current passed through the network (at least within a limited range of values of the current) for a first direction of power transfer through the network, the said means being ineffective for the reverse direction of power transfer through the network.

According to a feature of the invention, such an impedance network comprises a four-terminal electrical impedance network having a first terminal pair, a second terminal pair, and two impedances connected effectively in series with each other in a closed current path which comprises the said network and hypothetical current paths external to the network and terminating on the first and second terminal pairs thereof, the said impedances being shunted by individual rectifier elements oppositely poled with respect to a common direction of current flow round the said closed current path; the said means being responsive to the instantaneous potential difference between the terminals of the first terminal pair for applying across each said impedance a further potential difference which is proportional to, and not greater than, the terminal potential difference, the said means being effective only when the polarity of the terminal potential difference is such as to tend to cut off the shunt rectifier element of the said impedance and the polarity of the potential difference applied thereby to the impedance being also such as to tend to cut off the shunt rectifier element. The first or "normal" direction of power transfer through the network is from the first terminal pair to the second terminal pair. In the preferred form of the invention, to be hereinafter described, the dynamic impedance of the network is zero for power transfer through it in the normal direction (within the limiting range of operating conditions), and equal to the value of one of the said impedances for power transfer in the reverse direction.

The network preferably has a balanced configuration, the two impedances being disposed one in each series arm of the network. The said means may then comprise a centre-tapped inductive winding connected between the ends of the said impedances nearer the first terminal pair, the centre-tapped winding being connected through further rectifier elements to the other ends of the impedances. The centre-tapped winding may act as an auto-transformer, or may be the secondary winding of an isolating transformer, the said closed current path being then completed between the terminals of the first terminal pair solely by the winding instead of through the external circuit. Similarly, a winding of a second isolating transformer may be connected between the terminals of the second terminal pair to complete the closed current path between these terminals.

According to a further feature of the invention, electrical distribution apparatus comprises two or more alternating current sources, each arranged to be connected through a circuit breaker to a common point and each also arranged to be connected through auxiliary contacts of the associated circuit breaker to a common metering bus-wire, an impedance network according to any of the foregoing features of the invention being interposed between each source and the bus-wire and so connected that power transfer from the source to the bus-wire corresponds to the said first direction of power transfer through the network. The apparatus preferably includes also a transformer having its primary winding arranged for energization by the said source and energizing the bus-wire from its secondary winding through the said impedance network and the said auxiliary contacts in series. In a typical arrangement, connections to a synchronizing instrument or apparatus are taken from the bus-wire and from points between the auxiliary contacts and the transformer associated with each source.

The function of the impedance networks in such an arrangement is to provide a measure of protection against the consequence of failure of any of the circuit breaker auxiliary contacts to operate correctly.

The foregoing and other features of the invention will be evident from the following description of part of an electrical distribution system including a circuit arrangement for parallel operation of a number of alternating current sources, embodying the invention in its preferred form. The description refers to the accompanying drawings in which FIG. 1 is a circuit diagram of one preferred form of the invention, and FIG. 2 is a circuit diagram of a second preferred form of the invention.

Figure 2:
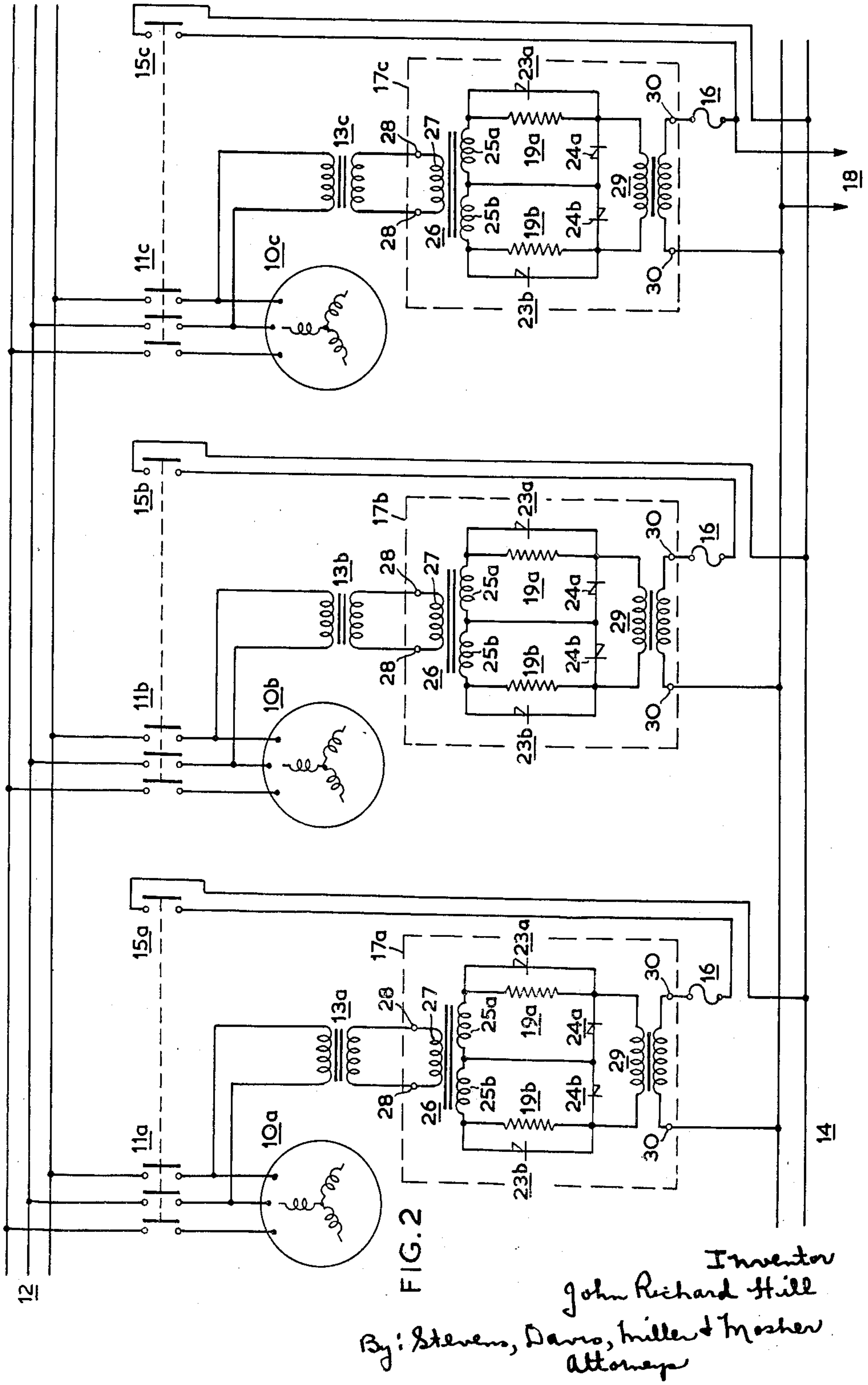

In FIGS. 1 and 2 there are shown three alternators **10*a*, 10*b* and 10*c*, which are connected through corresponding circuit breakers 11*a*, 11*b* and 11*c* to a common set of bus-bars 12. Each alternator is also directly connected to a voltage transformer 13*a*, 13*b*, 13*c* which transforms the relatively high alternator voltage to a lower value suitable for instrumentation. This secondary voltage is fed to a common metering bus-wire 14 through auxiliary contacts 15*a*, 15*b* or 15*c* of the corresponding circuit breaker. A fuse 16 is connected in each low-voltage line, as is an impedance network 17*a*, 17*b* or 17*c***, the arrangement and function of which will be described below.

The circuit breaker auxiliary contacts **15*a*, 15*b*, 15*c* move in correspondence with the load-carrying main contacts of the corresponding circuit breaker, opening when the main contacts open, and closing when they close. Hence, if the main bus-bar 12 is energized from the alternator 10*a*, the circuit breaker 11*a* being closed, the bus-wire 14 will be supplied through the closed auxiliary contacts 15*a* with a voltage which bears a known voltage and phase relationship with that applied to the main bus-bars 12. In order to bring a second alternator, say the alternator 10*c*, on to the bus-bars 12, the two alternators must be brought into phase and voltage synchronization before the circuit breaker 11*c*** can be closed.

Inputs 18 to synchronizing devices for indicating in conventional manner when this state is achieved are obtained from the bus-wire 14 and from a point between the "incoming" alternator 10*c* and the corresponding auxiliary contacts 15*c*.

It is evident that the normal direction of power transfer through the impedance networks 17*a*, 17*b*, 17*c* is always from the voltage transformer 13*a*, 13*b* or 13*c* to the bus-wire 14. If, however, the circuit breaker auxiliary contacts 15*a*, 15*b* or 15*c* fail to open as the main contacts open or, either accidentally or by design, open some time later than the main contacts, conditions can arise in which the secondary of one voltage transformer can be energized from the secondary of another; and if no preventive measures were taken the resultant current surges might be sufficient to damage the transformers or to blow the fuses 16. The function of the impedance networks 17*a*, 17*b* and 17*c* is to limit any reverse power flow to the secondaries of the voltage transformers under these conditions.

The circuit shown in FIG. 1 comprises a balanced four-terminal network having a series impedance 19*a* or 19*b* in each arm. Input and output terminals are shown at 20*a*, 20*b* and 21*a*, 21*b* respectively. A centre-tapped auto-transformer 22 is connected between the input terminals 20*a* and 20*b*.

Each of the impedances 19*a* and 19*b* is shunted by a rectifier 23*a* or 23*b* having the polarity shown in the drawings. Further rectifiers 24*a* and 24*b* are connected with the polarity shown between the centre tap of the auto-transformer 22 and the ends of the impedances remote from the auto-transformer. The operation of the circuit would be unaffected if the polarity of all these rectifiers were reversed, provided that their relative polarities are unchanged. The two arms of the network form sections of a closed current path which is completed by the external circuits connected respectively between the input terminals 20*a* and 20*b* and between the output terminals 21*a* and 21*b*. The shunt rectifiers 23*a* and 23*b* are oppositely poled with respect to a common direction of current round this closed path. The remaining rectifiers 24*a*, 24*b* are connected so that they will pass voltages induced in the half-windings 25*a* and 25*b* in such a sense as to bias the corresponding shunt rectifiers 23*a* and 23*b* to the non-conductive condition; since the potential differences across the half-windings and between the terminals 20*a* and 20*b* evidently have the same sense, it follows that a potential difference will be applied through a rectifier 24*a* or 24*b* across the associated impedance 19*a* or 19*b* only when the sense of the potential difference between the input terminals 20*a* and 20*b* is such as to cut off the shunt rectifier and cause a current to flow in the impedance.

The arrangement is such that for any one half-cycle of an alternating input voltage applied between the input terminals 20*a* and 20*b*, in "normal" power transfer conditions, one of the load impedances 19*a* or 19*b* is shunted by its parallel rectifier, while the voltage drop across the other is maintained at a value equal to half the instantaneous input voltage, irrespective (within limits) of the current taken by any load connected across the network output terminals 21*a* and 21*b*. In order to see how this action occurs, consider the case in which the input termial 20*a* is positive with respect to the other terminal 20*b*, and in which the resistive load is connected between the output terminals 21*a* and 21*b*. A clockwise circulating current then flows through the closed current path formed by the network and the external circuits; the impedance 19*a* is shunted by the rectifier 23*a*, which can be assumed to have a negligible impedance in this condition, while the impedance 19*b* carries the circulating current. Each half-winding 25*a* or 25*b* of the auto-transformer 22 has across it a potential difference equal to half the instantaneous potential difference between the input terminals, and having the same polarity. The voltage across the half-winding 25*a* is ineffective, being blocked by the rectifier 24*a*; but the voltage in the other halfwinding 25*b* drives a clockwise circulating current through the rectifier 24*b* and the impedance 19*b*, the value of this current being such that when added to the current taken by the load it develops across the impedance 19*b* a potential difference equal to the voltage across the winding 25*b*. Variations in the load current are thus ineffective to vary the voltage drop across the impedance, provided that the part of the voltage drop in the impedance due to the load current does not exceed the potential difference across the winding 25*b*. When this condition is reached further compensation is prevented.

The operation of the circuit for the other half-cycle of the input voltage can be determined in the same way. Thus for all values of load current up to a predetermined value changes in load current do not produce any change in the voltage at the output terminals 21*a* and 21*b*: in other words the network has within these limits a zero dynamic impedance. Once the predetermined value of load current has been exceeded the network behaves as an impedance equal to one of the impedances 19*a* or 19*b*, but the network is not intended, in the application shown, to operate in this condition.

For conditions in which reverse power flow tends to occur, that is when the voltage at the output terminals 21*a* and 21*b* is greater than one-half that at the input terminals, the network behaves as an impedance for all values of current since the auto-transformer 22 is then ineffective to maintain the voltage drop in the impedances.

Consider, for example, conditions in which the normal input terminals 20*a* and 20*b* are joined by a passive load circuit, and an alternating potential difference is applied to the normal output terminals 21*a* and 21*b*. For values of the applied potential such that terminal 21*a* is positive with respect to terminal 21*b*, an anti-clockwise circulating current flows in the main closed current path; this current flows through the impedance 19*a* and through the shunt rectifier 23*b* of the other impedance, which is therefore ineffective. The voltage drop in the active impedance 19*a* is unaffected by the potential difference across the associated half-winding 25*a*, since the sense of the latter is such that it is blocked by the rectifier 24*a*. Thus, in reverse power transfer conditions, the network presents for all current values, an impedance equal to that of one of the impedances 19*a* and 19*b*.

In the arrangement shown in FIG. 2 the impedances 19*a* and 19*b*, their shunt rectifiers 23*a* and 23*b* and the further rectifiers 24*a* and 24*b* are arranged exactly as in FIG. 1. The half-windings 25*a* and 25*b* from which the compensating voltages for application to the impedances 19*a* and 19*b* are derived, form, however, the secondary winding of an input transformer 26 of the network. The primary winding 27 of the transformer is connected directly between input terminals 28 of the network, which are therefore electrically isolated from the network proper.

A second isolating transformer 29 is provided in the same way at the output of the impedance network, its secondary winding being connected between the output terminals 30.

With this configuration of the impedance network, the closed current path previously referred to in explaining the operation of the circuit is comprised wholly within the impedance network itself and is independent of the external circuits; the operation of the network is, however, precisely the same as that of the network shown in FIG. 1.

The arrangement of FIG. 2 may be adapted when the electrical isolation of the various parts of the metering network is desirable. It will be understood that in certain applications it will be unnecessary to provide isolating transformers on both sides of the network. It will also be understood that the arrangements shown in FIGS. 1 and 2 are not the only possible arrangements within the ambit of the present invention for the impedance network, and that the impedance network is suitable for other applications.

What I claim as my invention and desire to secure by Letters Patent is:

1. An electrical reverse power limitation impedance network comprising a first input connection; a first output connection; a second input connection; a second output connection; a first impedance connected between said first input connection and said first output connection; first rectifier means connected in parallel with said first impedance and having a polarity only to pass current in the direction from said first input connection to said first output connection; a second impedance connected between said second input connection and said second output connection; second rectifier means connected in parallel with said second impedance and having a polarity only to pass current in the direction from said second input connection to said second output connection; an inductive winding connected between the ends of said impedances nearer said input connections; first tapping means connected between a point on said inductive winding between its ends and the end of said first impedance nearer the first output connection and containing rectifier means having a polarity only to pass current in the direction from said point to the end of said first impedance nearer the first output connection; and second tapping means connected between a point on said inductive winding between its ends and the end of said second impedance nearer the second output connection and containing rectifier means having a polarity only to pass current in the direction from said point to the end of said second impedance nearer the second output connection, whereby the flow of current in the direction from the output connections to the input connections is limited.

2. An electrical reverse power limitation impedance network comprising a first input terminal; a first output terminal; a second input terminal; a second output terminal; a first impedance connected between said first input terminal and said first output terminal; first rectifier means connected in parallel with said first impedance and having a polarity only to pass current in the direction from said first input terminal to said first output terminal; a second impedance connected between said second input terminal and said second output terminal; second rectifier means connected in parallel with said second impedance and having a polarity only to pass current in the direction from said second input terminal to said second output terminal; a centre tapped auto-transformer connected between the ends of said impedances nearer said input terminals; first tapping means connected between the centre the direction from said centre to the end of said first impedance nearer the first output terminal and containing rectifier means having a polarity only to pass current in the direction from said centre to the end of said first impedance nearer the first output terminal; and second tapping means connected between the centre of said auto-transformer and the end of said second impedance nearer the second output terminal and containing rectifier means having a polarity only to pass current in the direction from said centre to the end of said second impedance nearer the second output terminal, whereby the flow of current in the direction from the output terminals to the input terminals is limited.

3. An electrical reverse power limitation impedance network comprising a first input terminal; a second input terminal; an input transformer having a primary winding connected between said input terminals and a secondary winding, the ends of said secondary winding forming first and second input connections of said networks; a first output terminal; a second output terminal; an output transformer having a secondary winding connected between said first and second output terminals and having a primary winding connected between first and second output connections of the network; a first impedance connected between said first input connection and said first output connection; first rectifier means connected in parallel wtih said first impedance and having a polarity only to pass current in the direction from said first input connection to said first output connection; a second impedance connected between said second input connection and said second output connection; second rectifier means connected in parallel with said second impedance and having a polarity only to pass current in the direction from said second input connection to said second output connection; first tapping means connected between a point on said secondary winding of the input transformer and the end of said first impedance nearer the first output connection and containing rectifier means having a polarity only to pass current in the direction from said point to the end of said first impedance nearer the first output connection; and second tapping means connected between a point on said secondary winding of the input transformer and the end of said second impedance nearer the second output connection and containing rectifier means having a polarity only to pass current in the direction from said point to the end of said second impedance nearer the second output connection, whereby the flow of current in the direction from the output terminals to the input terminals is limited.

4. An electrical reverse power limitation impedance network comprising a first input connection; a first output connection; a second input connection; a second output connection; a first impedance connected between said first input connection and said first output connection; first rectifier means connected in parallel with said first impedance; a second impedance connected between said second input connection and said second output connection; second rectifier means connected in parallel with said second impedance; and means responsive to the instantaneous potential difference between said first and second input connections to apply across each of said first and second impedances a further potential difference in the sense to tend to cut off the corresponding rectifier means, said further potential difference being proportional to and not greater than said instantaneous potential difference, whereby in one direction of current flow the voltage drop across the impedances is unaffected by the load current and whereby in the other direction of current flow the impedances are effective for all values of current.

References Cited in the file of this patent

UNITED STATES PATENTS

| | | |
|---|---|---|
| 2,100,364 | Stivender | Nov. 30, 1937 |
| 2,106,858 | Snyder | Feb. 1, 1938 |
| 2,115,595 | Tanai | Apr. 26, 1938 |
| 2,595,024 | Toulon | Apr. 29, 1952 |